United States Patent [19]

Finn et al.

[11] Patent Number: 4,473,950
[45] Date of Patent: Oct. 2, 1984

[54] CRANKSHAFT ALIGNMENT TOOL

[75] Inventors: Albert E. Finn, Marblehead; Leon G. Wilde, Andover, both of Mass.

[73] Assignee: The Indikon Company, Cambridge, Mass.

[21] Appl. No.: 467,590

[22] Filed: Feb. 18, 1983

[51] Int. Cl.³ ............................................... G01B 7/14
[52] U.S. Cl. ............................. 33/143 L; 33/147 K; 33/149 J; 33/180 AT
[58] Field of Search ............ 33/147 K, 147 N, 149 J, 33/143 L, 180 B, 180 AT, 181 AT, DIG. 1

[56] References Cited

U.S. PATENT DOCUMENTS

| | | | |
|---|---|---|---|
| 2,313,989 | 3/1943 | Caldwell et al. | 33/DIG. 5 |
| 3,820,386 | 6/1974 | Grikscheit et al. | 33/180 B |
| 3,877,151 | 4/1975 | Roberts | 33/181 AT |
| 3,927,476 | 12/1975 | Martin | 33/143 L |
| 3,937,271 | 2/1976 | Akiba et al. | 33/DIG. 5 |
| 4,338,726 | 7/1982 | Swailes | 33/172 B |

*Primary Examiner*—Willis Little
*Attorney, Agent, or Firm*—Weingarten, Schurgin, Gagnebin & Hayes

[57] ABSTRACT

A remote reading crankshaft alignment tool utilizes a differential transformer and live centers to measure the deflection of crankshaft webs as a function of crankshaft angle. The tool is positioned between adjacent webs to measure the difference in spacing between preset points on the crankshaft webs as the crankshaft is rotated, with any misalignment resulting in a difference in output as the crankshaft is rotated. The live centers are in the form of conical-shaped feelers mounted in bearings, with the live centers fitting into punch marks in opposing webs. In one embodiment, one feeler is fixed with respect to the tool body and the other is spring-loaded and slidably mounted in the tool body. An extension of the slidably mounted feeler includes a ferromagnetic coupling slug which is initially centered in a split-winding differential transformer within the tool. Web deflections are measured by the differential output from the transformer as the crankshaft is rotated, with the tool being maintained in a vertical orientation by a weighted arm or handle mounted perpendicular to the longitudinal axis of the tool. The angular orientation of the crankshaft is measured through the utilization of a magnetically held plate which surrounds the fixed feeler, with the magnets securing the plate to one of the webs. The plate is mounted to a shaft which is rotably mounted to the tool housing. As the crankshaft is rotated and the tool is maintained upright by the weighted arm, the shaft rotates relative to the tool housing, with the measured shaft angle correlating to the angular position of the crankshaft. In one embodiment, the shaft is that of a potentiometer, to which a voltage is applied. The rotation of the shaft causes a proportional change in the voltage at the arm of the potentiometer.

15 Claims, 5 Drawing Figures

CRANKSHAFT ALIGNMENT TOOL

FIELD OF INVENTION

This invention relates to feeler gages, and more particularly to a method and apparatus for ascertaining web deflections which indicate crankshaft alignment for internal combustion engines or compressors.

BACKGROUND OF THE INVENTION

The primary purpose for checking crankshaft alignment is to determine if the main bearings are in exact or true alignment. If any distortion to the crankshaft alignment is present, it means either that there is excessive wear on one or more of the main bearings supporting the crankshaft or that the engine base is not being supported on a true horizontal plane. As a matter of practice, crankshaft alignment should be checked on a regular basis for the crankshafts in large diesel and gas engines, as well as in large compressors of the reciprocating type. Recommended intervals vary, but checking after 8,000 hours of use is recommended. Crankshaft alignment in general should be checked when the engine temperature is reasonably close to operating conditions and should always be checked after foundation bolts have been tightened or any adjustment is made to the rails or the sole plates for the engine. The two methods most commonly used to determine crankshaft alignment of an engine in service is by checking the crank web deflection at each throw or through the use of a bridge gage to determine the elevation of the crankshaft journal with relation to each main bearing support. The recommended procedure is that crankshaft alignment be determined by checking crank web deflection.

Crankshaft web deflection is most accurately measured with a deflection gage. In the past, any number of feeler gages have been utilized for this purpose, most notably the Starret Model 696 crankshaft distortion dial gage. In practice, a mechanic, upon stopping an engine, removes the side covers and either reaches into or climbs inside the crankcase. While the engine is still hot, usually on the order of 120° Fahrenheit, a gage is placed between the walls of adjacent throws and the change in openings between the walls is observed as the crank is rotated something less than 360 degrees.

The temperature of the engine, the presence of hot oil, the close confines of the engine, and the difficulty of reading the gage in its extreme position, usually with a mirror, all operate to make web deflection measurements difficult and therefore suspect, particularly since a variation of only 0.001 inches is cause for concern. The job of making the web deflection measurement is usually relegated to the most junior person due to the difficult and time-consuming aspects of the measurement. If an inexperienced person were to misread the web deflection, depending upon the direction and magnitude of the error, a crankshaft failure or an unnecessary realignment process could result. More importantly, as the crankshaft rotates, the gage rotates relative to the webs in punch marks provided in opposing webs. Because the Starrett gages have dead centers, e.g., measuring pins which are fixed to the tool, gross measuring errors occur. Since the punch marks may not be symmetrical, the rotation of the corresponding pins in the punch marks results in large measuring errors. It will be appreciated that a punch mark is not designed to be a bearing, although it serves in this manner with Starrett gages. Thus the punch mark serves as a very imprecise bearing causing large measurement errors.

Mechanical or electromechanical feeler gages are illustrated by U.S. Pat. Nos. 3,119,187; 3,233,329; 3,958,337; 4,034,477; 4,087,918; 4,172,325; and 4,279,079. With respect to this last-mentioned patent, a direct feeling gage is provided in which pivoted feeler arms have two paced-apart transducer elements at the ends of the arms opposite the feeler ends. The spacing of the transducer elements is dependent upon the distance measured by the feeler arms. Referring to U.S. Pat. No. 3,958,337, a differential transformer is provided in a direct feeling measurement tool which includes a movable core serving as a coupling element for the differential transformer. The movable core is suspended by a wire which runs between a movable arch and a spring mounted to a fixed portion of the tool. The movement of the transformer core is in response to the flexing of the arch which is turn is caused by the relative spacing of two opposed feeler members. The movement of the feeler members is along a line perpendicular to the line along which the movable core moves. This device transforms movement in one direction to movement in another direction by virtue of the flexure of the arch which may be either U- or V-shaped. As a result, very large displacements of the feeler fingers result in a relatively small movement of the top of the arch. The accuracy of this device not only depends on the flexure characteristic of the arch, but also is diminished due to the relatively large amount of motion between the feeler fingers necessary to produce movement of the arch. In fact, the entire measuring system is determined by the flexible characteristics of the supports for the feeler fingers, as well as the flexure characteristic of the arch itself. This results in nonlinear measurements and measurements which are exceedingly error-prone.

SUMMARY OF THE INVENTION

In order to solve the problem of crankshaft alignment measurements, an accurate remote reading feeler gage is provided which has live centers and which measures the deflection of crankshaft webs in terms of the difference in distance between preset points on the crankshaft webs as the crankshaft is rotated. This measurement is displayed at a location remote from the tool by meters which indicate variation of web separation as a function of crankshaft angle. The live centers of the tool are inserted into punch marks previously formed on the interior surface of the webs such that the tool is suspended from the punch marks. The tool body is weighted, in one embodiment with the weight carried in a handle or perpendicular extension from the tool, such that the tool maintains its vertical orientation as the crankshaft and webs rotate, for instance, through 270 degrees. The live centers in one embodiment include conically shaped pins or points which are mounted in bearings which permits the tool body to be maintained in its vertical orientation as the crankshaft rotates. Once the tool has been mounted between opposing crankshaft webs, the live centers do not move relative to the punch marks and maintain their original seating. This increases the accuracy of the measurement, since the seating of the feelers stays the same throughout the measurement.

One of the live centers is maintained in a fixed position relative to the longitudinal axis of the tool body, whereas the opposing live center is spring-loaded against the opposing web. The spring-loaded live center is provided with a shaft which is mounted for reciprocation through the tool body along the longitudinal axis of the tool, with the end of the shaft carrying a ferromagnetic coupling slug which lies internal to a differential transformer which includes a coaxially located primary and split secondary. With the tool in place, the slug position is adjusted so that the differential output of the transformer is zero, with the slug being positioned symmetrically across the split secondary. This initializes the system, such that if during rotation there is any movement of the slug vis-a-vis the split secondary, this difference will be measured as a differential in either voltage or current through the split secondary of the differential transformer, with the differential voltage or current being displayed at an appropriate meter.

The crankshaft angle is determined through the utilization of a magnetically held fixture which coaxially surrounds the fixed live center. The magnetic fixture includes magnets which attach to the web to which the fixed live center is seated, with the fixture coaxially surrounding the live center. The fixture includes a shaft, the free end of which is mounted for rotation to the tool body. In one embodiment, the shaft is set in a bearing which is centered in one end of the tool. The angular position of the crankshaft is sensed by a potentiometer having its casing fixed to the tool body and its shaft coupled to the shaft of the magnetically held fixture. As the crankshaft rotates the webs, the relative angular position between the vertically maintained tool body and the web changes, with this change being measured by the angular position of the fixture shaft relative to the tool body. This angular position is sensed by the potentiometer since its shaft is attached to the fixture shaft.

The utilization of such a calibration and alignment tool permits very accurate measurements of crankshaft alignment via web deflection in a very hostile environment. The use of the tool eliminates the problem of the dead centers of the Starrett gage and permits unattended measuring during rotation of the crankshaft. Since the engine crankshaft alignment is to be accomplished when the engine is hot and in the presence of hot motor oil, the subject remote reading tool, being easily mounted and designed for unattended operation, assures more accurate measurements than the visual inspection system afforded by the prior art Starrett gages. It will also be appreciated that this measurement is concerned with the difference in distance between the webs as opposed to making an absolute distance measurement. The absolute distance between the webs is not as important as the difference in web separation as the crankshaft rotates, which is a more accurate indication of the condition of main bearings or the degree of crankshaft alignment.

BRIEF DESCRIPTION OF THE DRAWINGS

These and other features of the subject invention will be better understood in connection with the detailed description taken in conjunction with the drawings in which.

DETAILED DESCRIPTION

Figure 1:
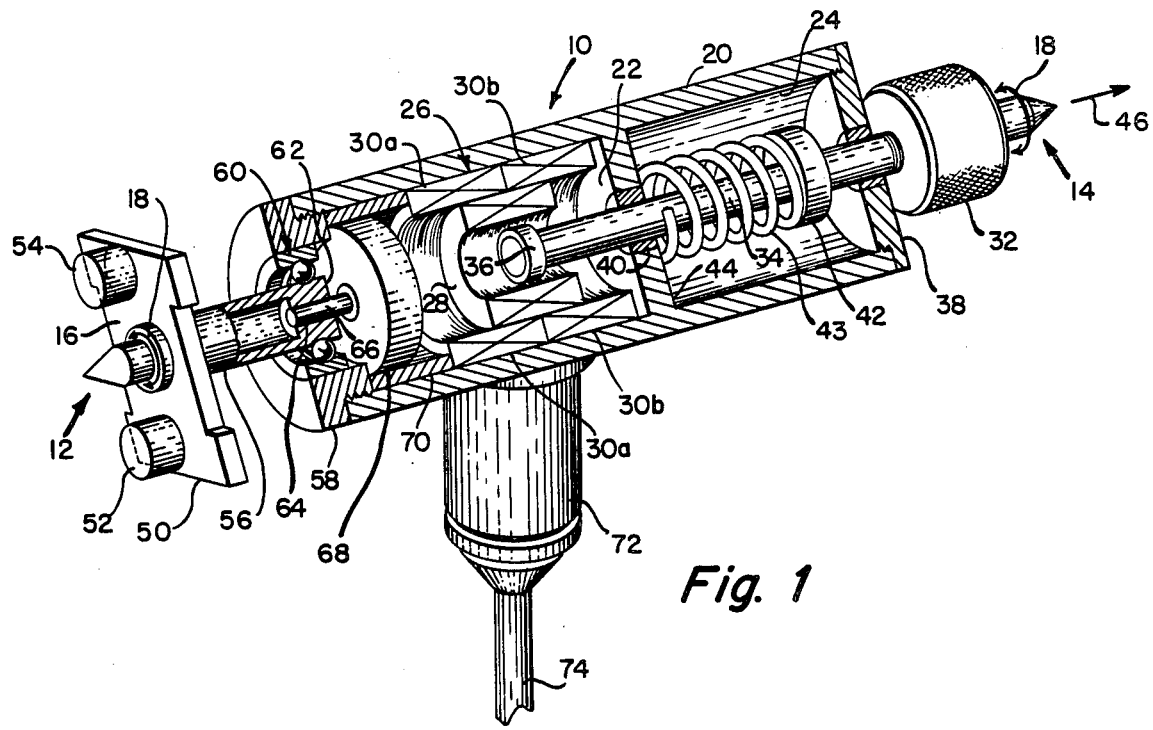
FIG. 1 is a diagrammatic and cross-sectional illustration of a crankshaft alignment tool utilizing a differential transformer, live centers, and a magnetic fixture for ascertaining crankshaft angle.

Referring now to FIG. 1, a remote reading tool 10 for the measurement of web deflection includes a pair of spaced apart feelers in the form of live centers 12 and 14 which are mounted in bearings 16 so that they are free to rotate in either direction as illustrated by double-ended arrows 18 with respect to tool body 20. Tool body 20 is divided into two compartments 22 and 24, with compartment 22 housing a differential transformer generally indicated at 26 to include a primary 28 and a split secondary comprising coils 30a and 30b.

Live center 14 is mounted to a coupling member 32 which is screw threaded onto a centrally carried shaft 34 which carries an electromagnetic coupling member in the form of a ferromagnetic slug 36 at the free end thereof. The screw-threaded coupling arrangement allows for initial centering of the slug by providing a variable-length shaft. This process is referred to as initialization of the tool. Shaft 34 is slidably mounted in bushings 38 and 40 such that the shaft is permitted to translate relative to the longitudinal axis of housing 20. A stop 42 in the form of a disc is mounted to shaft 34, with a spring 43 being positioned between stop 42 and a wall 44 of housing 20 so as to spring-load or urge live center 14 in the direction of arrow 46.

Bearing 16 supporting live center 12 is mounted to a fixture or plate 50 which includes magnets 52 and 54 mounted on diametrically opposite sides of live center 12. Plate 50 is mounted to a shaft 56 which is rotatably mounted to cap 58 of housing 20 via a bearing generally indicated at 60. Shaft 56 has an end portion 62 fixedly attached to the end of the shaft. This end portion has a channel 64 into which is positioned the shaft 66 of a potentiometer 68, the body of which is secured to housing 20 via a sleeve 70. While live center 12 is free to rotate with respect to plate 50 and shaft 56, the rotation of shaft 56 with respect to housing 20 causes shaft 66 of potentiometer 68 to turn.

Figure 2:
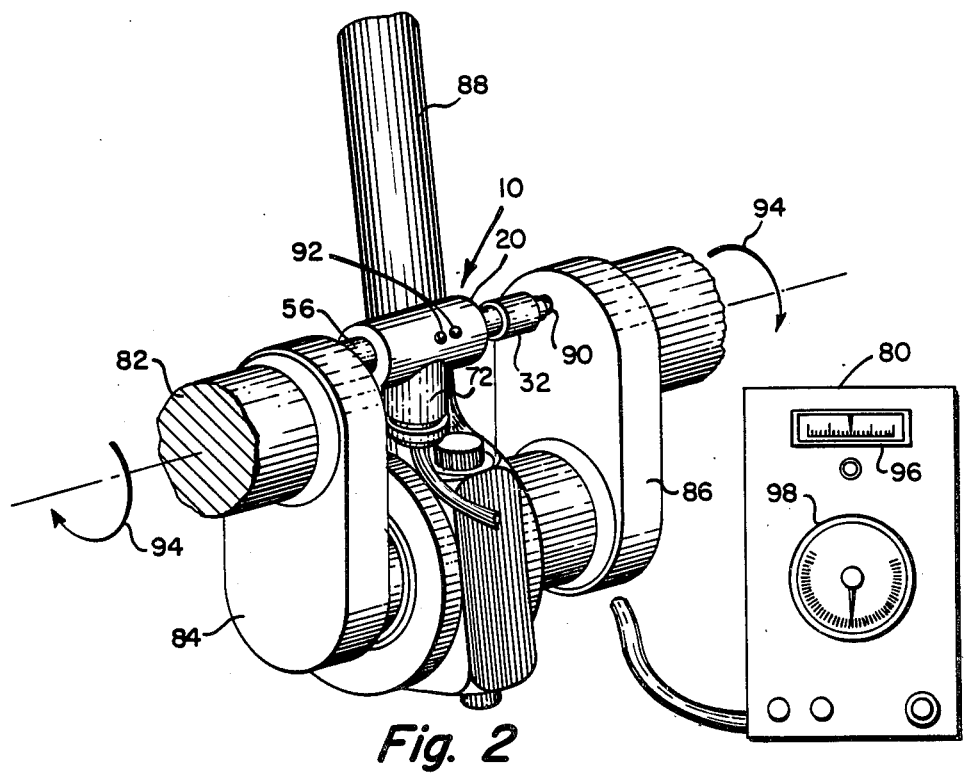
FIG. 2 is a diagrammatic illustration of the utilization of the tool of FIG. 1 to measure web deflection at each crankshaft throw, illustrating remote reading.

Tool 10 is provided with a weighted extension 72 which is oriented perpendicular to the longitudinal axis of housing 20 and from which electrical cable 74 is led to an appropriate remote reading indicator such that shown at 80 in FIG. 2. The weight is offset with respect to the axis defined by the spaced apart feelers to establish a vertical orientation of the tool body. Alternatively the weight can be carried at the bottom of the tool body.

Referring now to FIG. 2, a crank shaft 82 is illustrated as having webs 84 and 86 associated with a predetermined throw. A piston rod 88 is illustrated as being coupled to this throw in a conventional manner. Tool 10 is positioned between webs 84 and 86 as illustrated and is suspended from punch marks, one of which is illustrated at 90. Tool 10 is provided with two light emitting diodes (LEDs) 92 and 94 to initialize the system as will be described.

Figure 3:
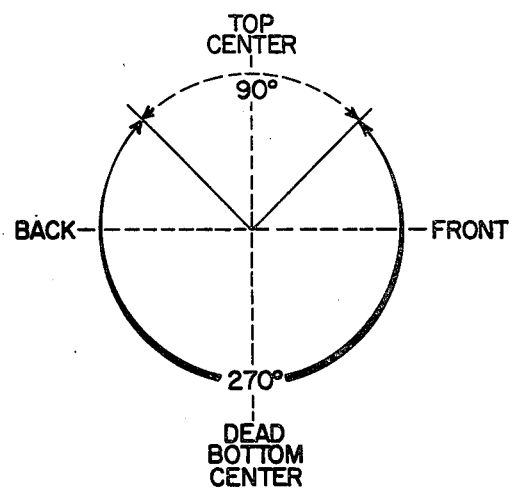
FIG. 3 is a diagrammatic illustration of the angle through which the crankshaft is rotated in order to obtain the requisite measurement.
Figure 4:
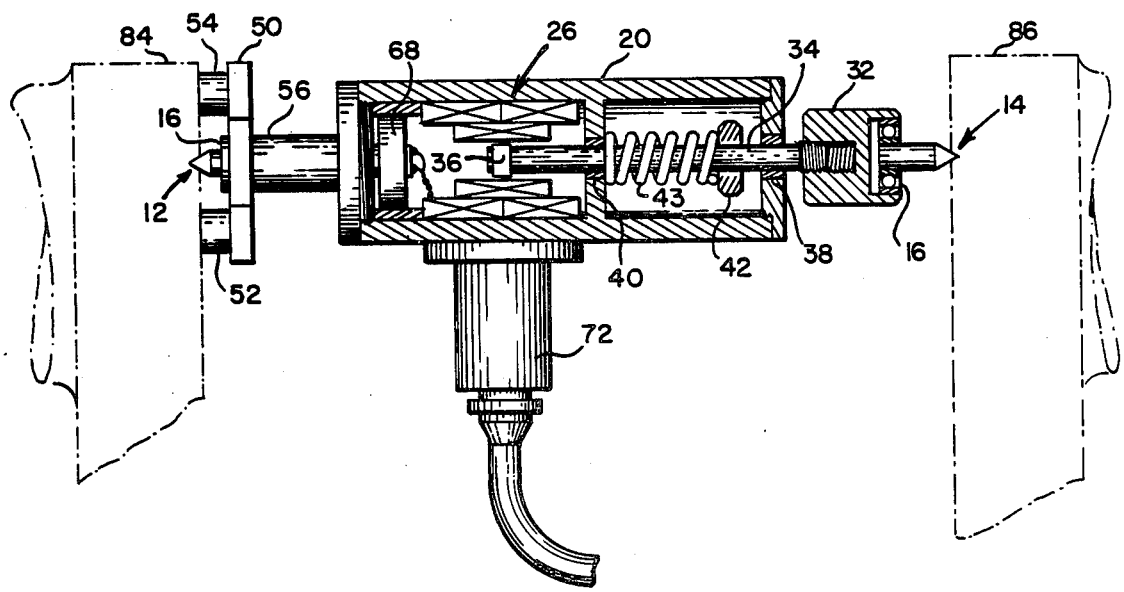
FIG. 4 is a diagrammatic and cross-sectional illustration of the tool of FIGS. 1 and 2 illustrating the live center seating of the tool between opposing crankshaft webs, also illustrating the attachment of the magnetic fixture to one of the webs.

In operation, the tool is positioned in the aforementioned punch marks such that it is suspended vertically as illustrated, and coupling member 32 is rotated until one or more indicators in the form of lamps or LEDs 92 are extinguished. This corresponds to slug 36 of the device of FIG. 1 being positioned directly beneath the split between the secondary transformer coils. With the tool thus initialized, in one embodiment illustrated in FIG. 3, the crankshaft is rotated as illustrated by arrows 94 for 270 degrees. The difference in separation between the webs is indicated by meter 96, whereas the crankshaft angle is indicated by meter 98 such that the difference in web separation can be continuously monitored in terms of crankshaft angle as the crankshaft is rotated. Because of the weighting of arm 72, tool 10 remains in a vertical position as the webs rotate downwardly through bottom dead center and then upwardly, with the relative position of the tool vis-a-vis the crankshaft web being established by virtue of the magnetic fixing of plate 50 to web 84. It will be appreciated that the relative motion of shaft 56 vis-a-vis housing 20 corresponds to the angular orientation of the crankshaft relative to the initial position of the tool. This can be seen more clearly with respect to FIG. 4 in which like reference characters are utilized for like elements vis-a-vis FIG. 4 and FIGS. 1 and 2. As will be seen, magnets 52 and 54 maintain plate 50 fixed with respect to web 84. Since plate 50 is fixedly attached to shaft 56, as the webs rotate downwardly and then upwardly, shaft 56 rotates relative to housing 20, thereby causing the shaft of potentiometer 68 to rotate. The resistance provided by potentiometer 68 correlates the shaft 56 angle to the vertical established by weighted housing 20. Note that the potentiometer is connected between the power supply and ground through meter 98, and that the rotation of the shaft of the potentiometer causes a proportional change in the voltage at the arm of the potentiometer which is detected by meter 98.

With respect to the live centers, bearing 16 is illustrated in cross-section as being press-fit into coupling member 32 with the free rotation of live center 14 being established by the bearing.

Figure 5:
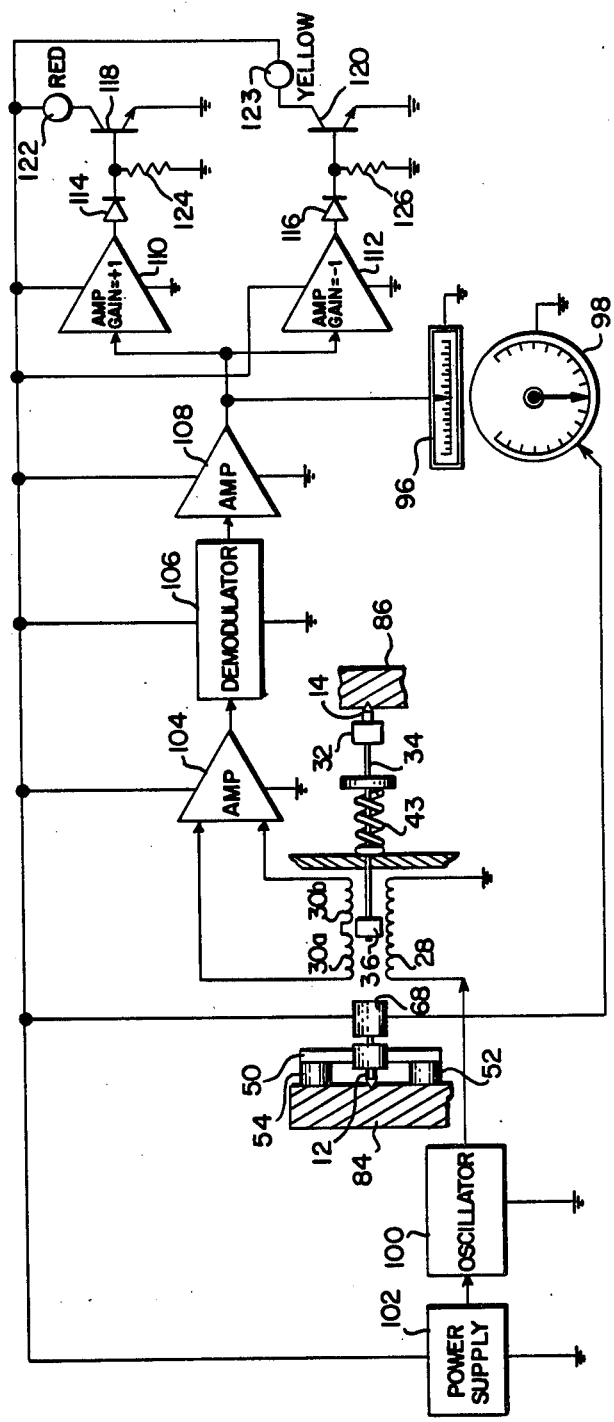
FIG. 5 is a block diagram of a circuit for utilization with the tool of FIGS. 1, 2, and 4.

Referring now to FIG. 5, a schematic diagram of a readout circuit includes an oscillator 100 driving primary 28, with a power supply 102 being provided for all of the units of the circuit. The output of the split secondary is applied to an amplifier 104 which is in turn coupled to a demodulator 106 which produces a DC signal corresponding in sign and magnitude to the difference between the signals in secondary 30a and secondary 30b. Such a demodulator is available as a phase detector circuit from Signetics Corporation of Sunnyvale, California, in which the DC average is + for leading phase and − for lagging phase. In the Signetic phase detector, the phase-shifted output of an All-pass equalizer is coupled to an electronic switch actuated by a square wave switching signal. The output of the electronic switch across a load is the phase detected output signal which, when averaged, provides the above DC signal.

The output of demodulator 106 is coupled to an amplifier 108 which is applied to meter 96. Additionally the output of amplifier 108 is coupled in parallel to an amplifier 110 having a gain of +1 and an amplifier 112 having a gain of −1. The output of these amplifiers are passed respectively through diodes 114 and 116 to the bases of transistors 118 and 120. The emitters of these transistors are grounded and the collectors thereof are coupled through lamps or LEDs 122 and 123 to power supply 102. It will be appreciated that the output potentiometer 68 is applied to meter 98.

In operation, slug 36 is centered such that no signal is applied to the bases of transistors 118 and 120 for the centered condition. This turns these transistors off such that neither the red nor the yellow indicator is actuated. When the slug is off-center, as would initially be the case, either the red indicator or the yellow indicator will be lit depending on whether the slug couples signal from the primary to secondary 30a or secondary 30b. Diode 114, working into resistor 124, requires that the output of amplifier 110 be greater than approximately 0.6 volts before transistor 118 is turned on. Similarly, diode 116 requires that the output of amplifier 112 also be greater than approximately 0.6 volts before transistor 120 is turned on.

Having above indicated a preferred embodiment of the present invention, it will occur to those skilled in the art that modifications and alternatives can be practiced within the spirit of the invention. It is accordingly intended to define the scope of the invention only as indicated in the following claims.

What is claimed is:

1. A remote reading crankshaft alignment tool adapted to be suspended between adjacent crankshaft webs between predetermined indented points on the interior faces of said webs comprising:
   a tool body having a longitudinal direction,
   means for maintaining said tool body orientation fixed with respect to the local vertical;
   means for establishing the angular orientation of said tool body with respect to that of one of said webs;
   a differential transformer mounted in said tool body and having a core with an interior channel;
   a pair of spaced apart feelers, one of said feelers being fixed in a longitudinal direction with respect to said body, said fixed feeler having a live center at the end thereof adapted to fit into one of said points, the other of said feelers being moveable in said longitudinal direction and having a live center at one end thereof adapted to fit into the other of said points, said moveable feeler being spring-loaded to move away from said tool body and having a variable-length shaft with an electromagnetic coupling member at the free end thereof, said electromagnetic coupling member adapted to move within the core of said differential transformer;
   a readout circuit coupled to said differential transformer; and
   means coupled to said readout circuit and said angular orientation establishing means for displaying the angular orientation of said tool with respect to said webs and the output of said differential transformer.

2. The tool of claim 1 wherein said angular orientation establishing means includes a fixture mounted for rotation about the live center associated with said fixed feeler and means for magnetically attaching a portion of said fixture to the adjacent web.

3. The tool of claim 2 wherein said angular orientation establishing means includes a potentiometer mounted in said tool body, said potentiometer having a shaft, and means for coupling said potentiometer shaft to said fixture such that said potentiometer shaft moves with angular movement of said fixture relative to said tool body.

4. The tool of claim 3 wherein said last-mentioned coupling means includes a further shaft, said further shaft being coupled to said fixture, and a bearing disposed between an end of said further shaft and said tool body for permitting rotation of said further shaft with respect to said tool body.

5. The tool of claim 1 and further including at least one indicator coupled to said differential transformer readout circuit for indicating a non-dead center condition of said electromagnetic coupling member within said core.

6. The tool of claim 1 wherein said tool body orientation maintaining means includes a weight offset from the axis defined by said feelers.

7. The tool of claim 6 wherein said tool includes a handle, said weight being mounted in said handle.

8. A distance measuring tool for measuring the distance between two portions of a part comprising:
 a tool body having a longitudinal direction and a differential transformer mounted therein, said transformer having a core with an interior channel;
 a feeler mounted to said tool body and fixed in a longitudinal direction with respect to said tool body;
 a spring-loaded moveable feeler having a shaft with an electromagnetic coupling member at one end thereof, said moveable feeler mounted to said tool body such that said moveable feeler is moveable longitudinally and such that said coupling member lies within said core;
 means carried by said tool for establishing the orientation of said tool with respect to said part;
 a readout circuit coupled to said differential transformer and said orientation establishing means for reading out feeler separation and orientation of said part with respect to said tool; and
 means for displaying the output of said readout circuit.

9. The tool of claim 8 and further including means for adjusting the length of said shaft.

10. The tool of claim 8 and further including live centers at the ends of said feelers.

11. The tool of claim 8 wherein said tool body includes a weight offset from the axis established by said feelers for establishing a vertical orientation of said tool body when said tool is suspended by said feelers.

12. The tool of claim 11 wherein said tool includes a handle, said weight being mounted in said handle.

13. The tool of claim 11 wherein said tool is used in connection with a part and further including means for establishing the angular orientation of said tool with respect to said part.

14. A method of determining web deflection for crankshaft webs having preset punchmarks on the interior surface thereof;
 suspending a tool having opposed feelers by said punchmarks, said tool having means for establishing the difference in separation between said feelers as said crankshaft is rotated, means for establishing the angular orientation of said tool with respect to said webs, means for maintaining said tool in a predetermined orientation as said crankshaft is rotated, and means for indicating difference in feeler separation as a function of crankshaft angle;
 initializing said tool for a starting crankshaft angle; and
 rotating said crankshaft.

15. A distance measuring device for use in measuring web deflection for crankshaft webs having preset punchmarks on the interior surface thereof, comprising:
 a tool having opposed feelers carried by said tool and adapted to be retained by said punchmarks; means coupled to said feelers for establishing the difference in separation between said feelers as said crankshaft is rotated; means at least partially carried by said tool for establishing the angular orientation of said tool with respect to said webs; means at least partially carried by said tool for maintaining said tool in a predetermined orientation as said crankshaft is rotated; and means for indicating difference in feeler separation as a function of crankshaft angle.

* * * * *